(12) United States Patent
He

(10) Patent No.: US 10,044,648 B2
(45) Date of Patent: Aug. 7, 2018

(54) MESSAGING AND UPDATING SERVICES OVER THE AIR FROM APPLICATION SERVERS TO APPLICATIONS IN MOBILE DEVICES

(76) Inventor: Jianping He, Edison, NJ (US)

( * ) Notice: Subject to any disclaimer, the term of this patent is extended or adjusted under 35 U.S.C. 154(b) by 376 days.

(21) Appl. No.: 13/607,796

(22) Filed: Sep. 9, 2012

(65) Prior Publication Data
US 2014/0074941 A1    Mar. 13, 2014

(51) Int. Cl.
*G06F 15/16* (2006.01)
*H04L 12/58* (2006.01)

(52) U.S. Cl.
CPC .................. *H04L 51/046* (2013.01)

(58) Field of Classification Search
CPC ..... G06Q 10/107; H04L 12/585; H04L 12/58; H04L 12/581; H04L 12/5855
See application file for complete search history.

(56) References Cited

U.S. PATENT DOCUMENTS

| | | | |
|---|---|---|---|
| 5,768,509 A * | 6/1998 | Gunluk .................. 709/203 |
| 5,794,142 A * | 8/1998 | Vanttila et al. .............. 455/419 |
| 7,280,818 B2 | 10/2007 | Clayton |
| 7,480,907 B1 | 1/2009 | Marolia et al. |
| 7,644,376 B2 | 1/2010 | Karachale et al. |
| 7,650,157 B2 | 1/2010 | Clayton |
| 7,702,322 B1 * | 4/2010 | Maurya et al. .............. 455/419 |
| 8,135,392 B2 | 3/2012 | Marcellino et al. |
| 2007/0043823 A1 * | 2/2007 | George et al. .............. 709/207 |
| 2007/0087765 A1 * | 4/2007 | Richardson et al. ......... 455/466 |
| 2008/0003991 A1 * | 1/2008 | Sievers et al. .............. 455/418 |
| 2009/0106382 A1 | 4/2009 | Arellano et al. |
| 2010/0227631 A1 | 9/2010 | Bolton et al. |
| 2011/0207483 A1 | 8/2011 | Weinstein et al. |
| 2012/0054314 A1 * | 3/2012 | Son et al. ..................... 709/219 |

FOREIGN PATENT DOCUMENTS

EP    2083369 B1 *    1/2012

OTHER PUBLICATIONS

Mikko Pohja (Server Push with Instant Messaging, Mar. 12, 2009, AMC, 6 Pages).*

* cited by examiner

*Primary Examiner* — Jason D Recek

(57) ABSTRACT

The present invention provides a method and system for messaging and updating services over the air from application servers to their corresponding applications in mobile devices, so that applications in mobile devices can receive instant notification messages about updates over the air from their corresponding application servers via instant messaging servers and communication networks, and can communicate back to their corresponding application servers to fetch updates over the air via communication networks, and then execute updates.

4 Claims, 3 Drawing Sheets

MESSAGING AND UPDATING SERVICES OVER THE AIR FROM APPLICATION SERVERS TO APPLICATIONS IN MOBILE DEVICES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

With the innovation and development of technology, more and more mobile devices have become part of people's daily lives. A person may have a number of mobile devices such as smart phones, tablets, and laptops. With many rich features, functionalities and application programming interfaces built into mobile devices, the creations of applications in mobile devices have become relatively easy and gained popularities to add services and values to mobile devices. It is not uncommon for a mobile device to have dozens of applications installed. At the time of this writing, Apple Inc declares that there are more than 500,000 applications in its App Store, whereas for Goggle Play, it is estimated to have more than 600,000 applications.

Applications in mobile devices can be categorized as games, entertainment, utilities, social networking, music, productivity, lifestyle, reference, travel, sports, navigation, healthcare & fitness, news, photography, finance, business, education, weather, books, medical, and etc. Once applications are installed in mobile devices, they can be running in foreground or background, but may not be aware of situations that their corresponding application servers have immediate application and/or user updates for them to fetch and/or execute. For example, suppose an application service provider find that there is a serious bug in its application that is installed in millions of smart-phones, and publish a patch and notice in its application server. If the owners of the corresponding smart-phones are aware of the bug and notice, they can make their smart-phones and/or the application in their smart-phones connect to the application server, fetch the bug-fix patch and apply the patch. The issue is how to notify all the owners of the corresponding smart-phones or how to notify all the corresponding smart-phones automatically, and during proper time-frame let these smart-phones and/or the application in these smart-phones connect to the application server, fetch the bug-fix patch and apply the patch. Although applications in mobile devices can initiate communication with their corresponding application servers by design such as through http or https interface, it is quite challenging for application servers to initiate communication with their corresponding applications in mobile devices due to security consideration such as firewall protection. In order for applications in mobile devices to get immediate updates from their corresponding application servers, certain communication mechanisms should be established between applications and their corresponding application servers. Traditionally there are two ways to facilitate such communication. One is pull-mode, where applications periodically pull application servers to fetch updates, and/or execute updates. The other is push mode, where application servers push instant notification messages to applications so that applications can connect to application servers, fetch updates, and/or execute updates right away. In the pull-mode mechanism, pulling frequency needs to be high enough to ensure data accuracy and timeliness, which could introduce high network traffic and scalability issue on applications servers. On the other hand, the push-mode mechanism allows instant on-demand notifications from applications servers to applications, therefore avoiding unnecessary network traffic and providing reasonable scalability on applications servers.

Short Messaging service (SMS) is a text messaging service provided by mobile operators for mobile phones. SMS messages and Wireless Application Protocol (WAP) messages on top of SMS bearer can be pushed into mobile phones and then relayed to applications in mobile phones near real-time. Due to the controllability of SMS by mobile operators, mobile device manufacturers and/or mobile operating system providers may build messaging services in their own data networks, instead of depending on messaging services from mobile operators. For example, Apple Inc has provided Apple Push Notification Service (APNS) for its mobile and desktop devices such as iPhone, iPad, and MAC, while Google Inc has implemented Google Cloud Messaging for Android (GCM).

The competitions among mobile device manufacturers and/or mobile operating system providers lead to proprietary protocols and costly implementations for mobile data messaging services. The lack of standardization on mobile data messaging services makes it hard for application service providers to design, implement and deploy their applications on different mobile devices and/or mobile operating systems. Therefore there is a need to provide a cost-effective and flexible solution for messaging services between applications in mobile devices and their corresponding application servers.

Instant messaging is a communication mechanism providing an instantaneous transmission of messages from senders to receivers between people with communication devices. There are a number of instant messaging service providers that have millions of subscribers. The present invention intents to utilize the widely used instant messaging services and provide messaging and updating services over the air from application servers to applications in mobile devices.

BRIEF SUMMARY OF THE INVENTION

The present invention provides a method and system for messaging and updating services over the air from application servers to their corresponding applications in mobile devices, so that applications in mobile devices can receive instant notification messages about updates over the air from their corresponding application servers via instant messaging servers and communication networks, and can communicate back to their corresponding application servers to fetch updates over the air via communication networks, and then execute updates. Application service providers of application servers, and mobile device subscribers setup accounts with instant messaging servers. Application servers and mobile devices have instant messaging clients that can subscribe to and communicate with each other for instant message exchange via instant messaging servers and communication networks. Mobile device subscribers determine whether applications and mobile devices should be registered or de-registered with their corresponding application servers for instant messaging services from application servers. If applications and mobile devices are granted permissions by mobile device subscribers to receive instant notification messages from their corresponding application servers, then application servers can push instant notification messages to mobile devices and their corresponding applications whenever there are application and/or user updates from application servers to mobile devices and their corresponding applications. After instant notification messages from application servers are received in mobile devices, they can be relayed to application servers' corresponding applications and optionally displayed on the screens of mobile devices. Applications can further process instant notification messages, communicate back to their corresponding application servers, fetch updates, and then execute updates.

DETAILED DESCRIPTION OF THE INVENTION

Figure 1:
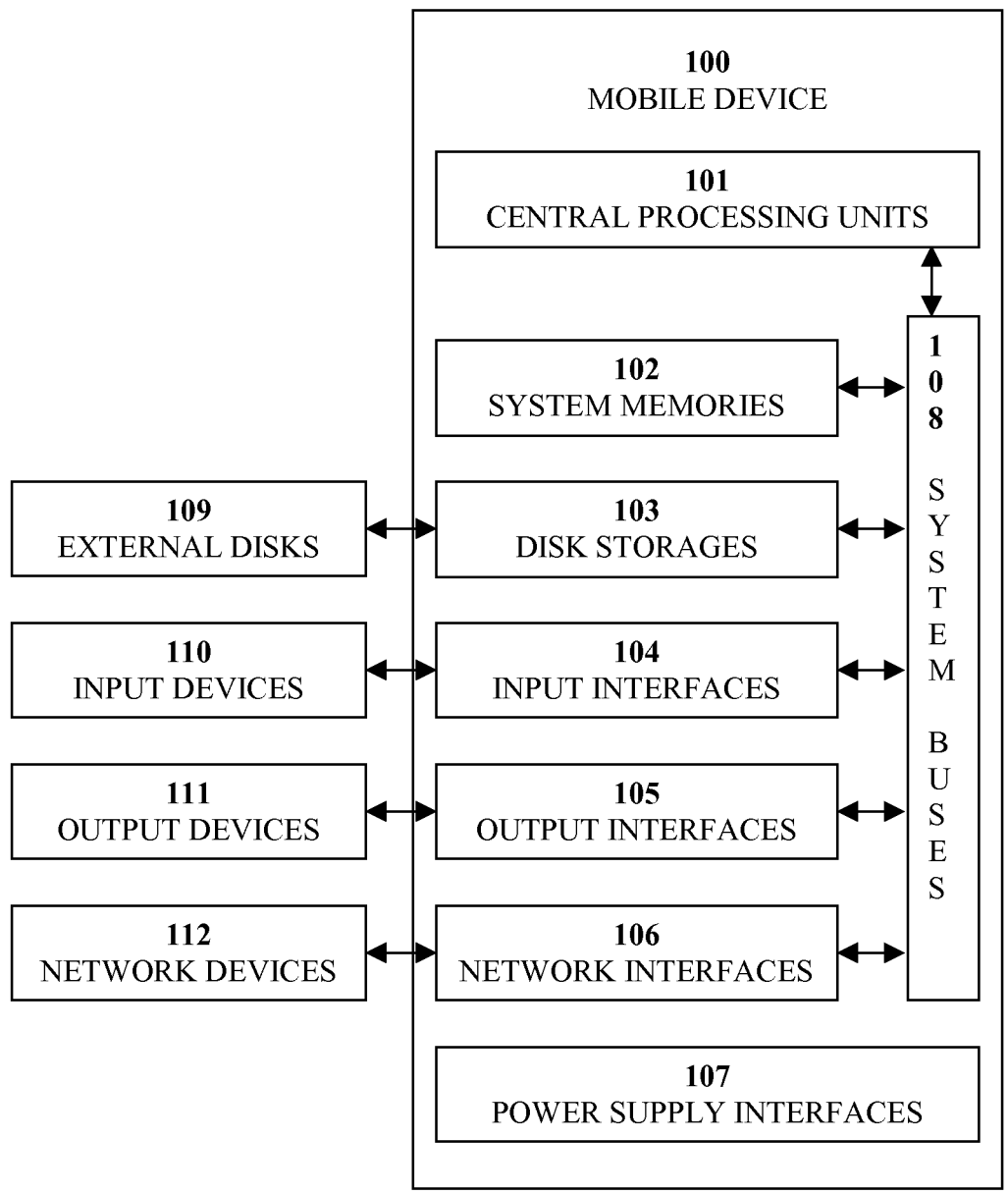
FIG. 1 illustrates a schematic architecture of a mobile device, in accordance with one embodiment of the present invention.

FIG. 1 illustrates a schematic architecture of a mobile device. In one embodiment, the mobile device 100 comprises central processing units 101, system memories 102, disk storages 103, input interfaces 104, output interfaces 105, network interfaces 106, power supply interfaces 107, and system buses 108.

The central processing units 101 provide a means for executing executable programs and can be any types of micro-controllers, processors, micro-processors, or multi-processors. The system memories 102 provide a means for storing executable programs such as a basic input/output system (BIOS), one or more operating systems, a plurality of firmware modules, and a plurality of software/application modules. The system memories 102 can be any combinations of random-access memory (RAM) and read-only memory (ROM). The disk storages 103 provide a means for storing programs, files and data, and can be any types of internal disks, external disks 109, optical disks, and the like.

The input interfaces 104 provide a means for transferring data into the mobile device 100 through the input devices 110 such as keyboard, keypad, touch-pad, touch screen, thumb-wheel, trackball, mouse, stylus, joystick, microphone, camera, sensor, etc. The input devices 110 can be internal or external parts of the mobile device 100. The output interfaces 105 provide a means for transferring data from the mobile device 100 to the output devices 111 such as screen, display, television, speaker, etc. The output devices 111 can be internal or external parts of the mobile device 100.

The network interfaces 106 provide a means for transferring data between the mobile device 100 and other network devices 112 via communication networks (not shown) such as circuit-switched telephone networks and/or packet-switched data networks. They can be any wireless interfaces such as radio with radio transmitter/receiver/antenna, wireless local/wide/metro area network interfaces, and may include other wireless, wired and satellite network interfaces.

The power supply interfaces 107 provide power to the mobile device 100. They can be a number of batteries. They may include external power sources such as AC adapters.

The system buses 108 provide a means for transferring data internally among the central processing units 101, the system memories 102, the disk storages 103, the input interfaces 104, the output interfaces 105, the network interfaces 106, and other components (not shown) of the mobile device 100.

Figure 2:
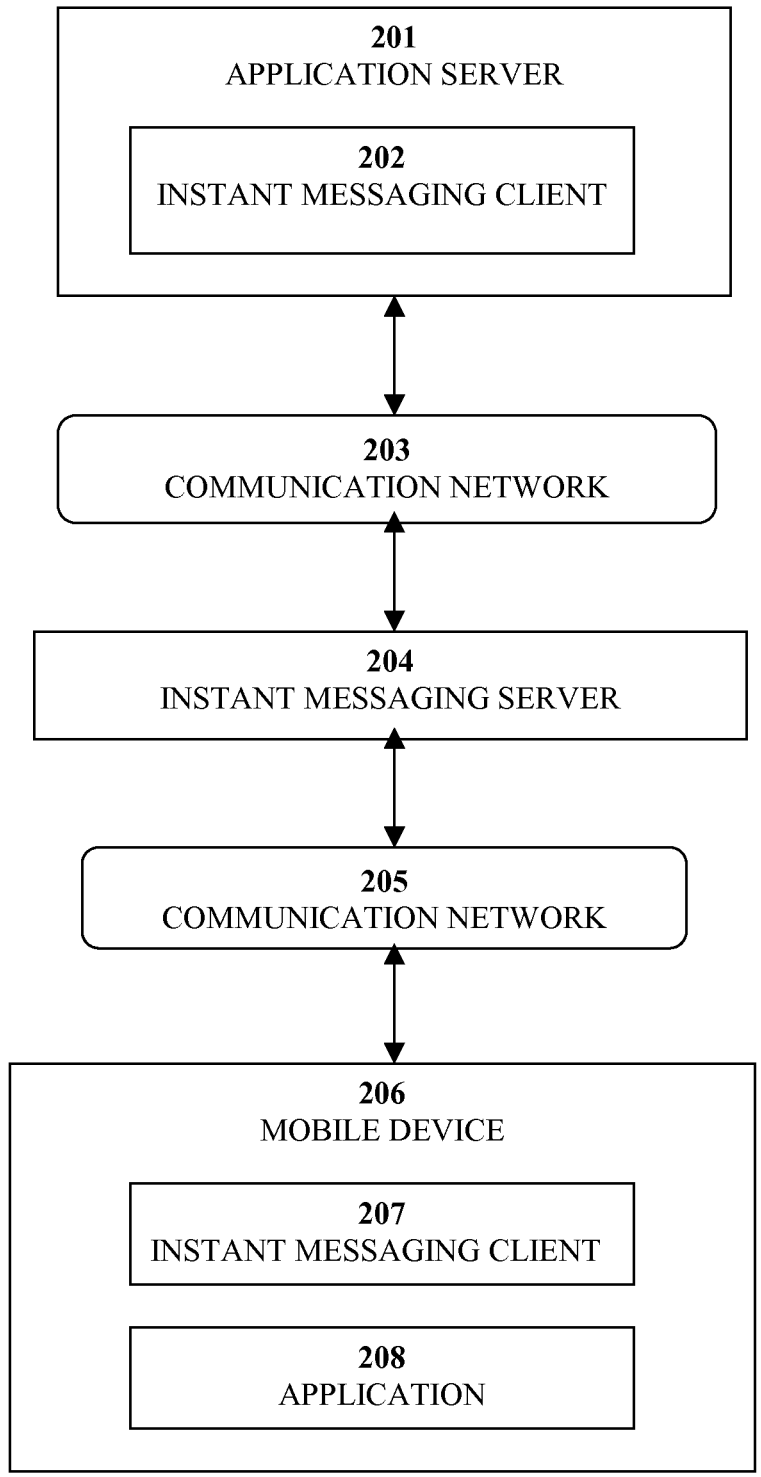
FIG. 2 illustrates a schematic block diagram of an application server, an instant messaging server, a mobile device, and two communication networks, in accordance with one embodiment of the present invention.

Reference is now to FIG. 2, which illustrates a schematic block diagram of an application server 201 with an instant messaging client 202, an instant messaging server 204, a mobile device 206 with an instant messaging client 207 and an application 208, a communication network 203 and a communication network 205. The instant messaging server 204 can be a public or private, standardized or proprietary instant messaging server, and is responsible for account registration and instant message relay between instant messaging clients. The subscriber of the mobile device 206 registers an account with the instant messaging server 204, so does the application service provider of the application server 201. The instant messaging client 202 in the application server 201 can communicate with other instant messaging clients via communication networks and the instant messaging server 204. The mobile device 206 has the same architecture as the one denoted in FIG. 1. The instant messaging client 207 in the mobile device 206 can communicate with other instant messaging clients via communication networks and the instant messaging server 204. The application 208 in the mobile device 206 is associated with the application server 201.

The communication network 203 and communication network 205 provide a means for transporting data between data senders and data receivers. The communication network 203 comprises one or more wireless networks, wired networks and satellite networks. The communication network 205 comprises wireless networks, zero or more wired networks and satellite networks. Wired networks can be any combination of internet, intranet, local area network (LAN) such as ethernet, wide area network (WAN) such as frame relay and asynchronous transfer mode (ATM), virtual private network (VPN), public switched telephone network (PSTN), and the like. Wireless networks can be any combination of wireless personal area network (WPAN) such as bluetooth and near field communication (NFC), wireless local area network (WLAN) such as Wi-Fi, wireless wide area network (WWAN), wireless metropolitan area network (WMAN) such as worldwide interoperability for microwave access (WIMAX), long term evolution (LTE), cellular network such as global system for mobile communication (GSM), general packet radio service (GPRS), code division multiple access (CDMA), evolution-data optimized (EV-DO), enhanced data rates for GSM evolution (EDGE), digital enhanced cordless telecommunication (DECT), integrated digital enhanced network (IDEN), and the like.

Figure 3:
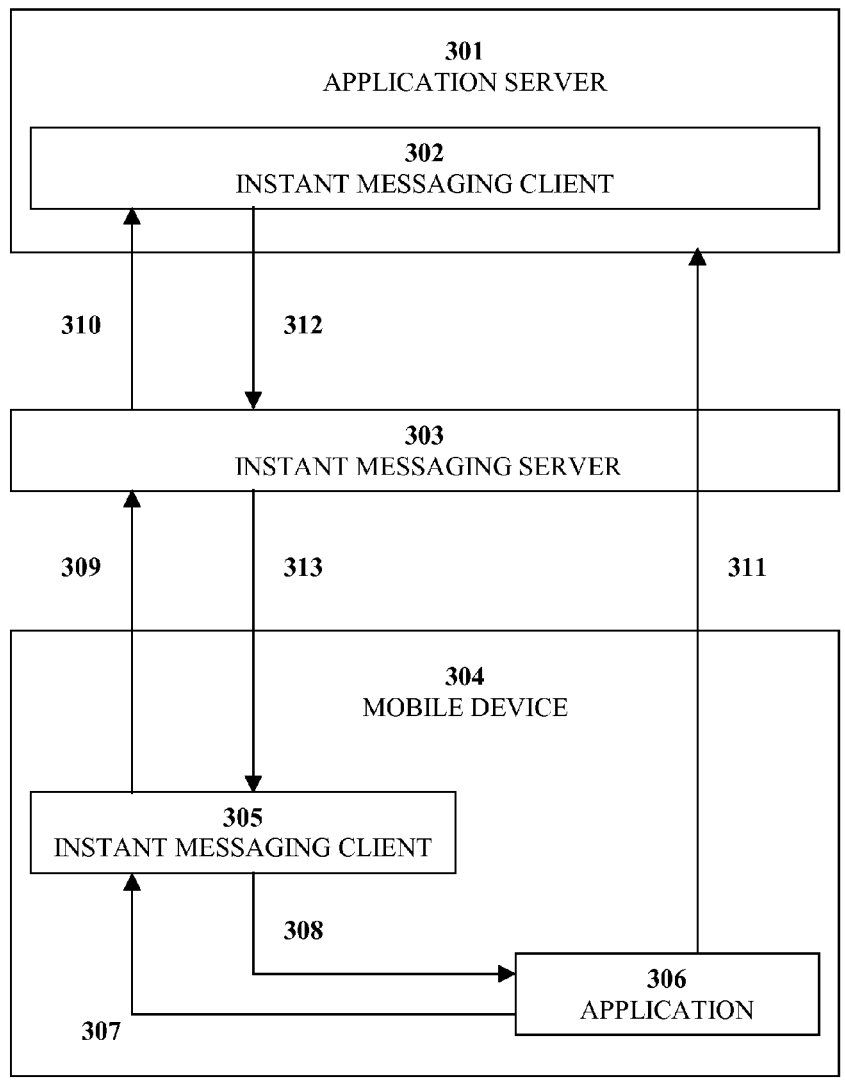
FIG. 3 illustrates a schematic block diagram of the interface and message exchange pattern among an application server with an instant messaging client, an instant messaging server, and a mobile device with an instant messaging client and an application, in accordance with one embodiment of the present invention.

Reference is now to FIG. 3, which illustrates a schematic block diagram of the interface and message exchange pattern among an application server with an instant messaging client, an instant messaging server, and a mobile device with an instant messaging client and an application. These entities have the same architectures as those denoted in FIG. 2, with communication networks omitted.

The mobile device 304 and/or the instant messaging client 305 may provide graphic user interfaces and/or application programming interfaces (APIs) to the application 306. These APIs can be remote procedure calls (RPCs), message exchanges using publisher/subscriber mechanism, and the like. In one embodiment, with the permission from the subscriber of the mobile device 304, the application 306 can send a registration/de-registration request through the interface 307 to the instant messaging client 305 for instant messaging services from the application server 301. The instant messaging client 305 can send a registration/de-registration response back to the application 306. After registration/de-registration request and response, the instant messaging client 305 can send the registration/de-registration status (failure or success) to the application server 301 through the interface 309 with the instant messaging server 303, and the interface 310 with the instant messaging client 302.

In another embodiment, with the permission from the subscriber of the mobile device 304, the application 306 can send a registration/de-registration request through the interface 307 to the instant messaging client 305 for instant messaging services from the application server 301. The instant messaging client 305 can send a registration/de-registration response back to the application 306. After registration/de-registration request and response, the application 306 can send the registration status directly through the interface 311 to the application server 301.

In another embodiment, with the permission from the subscriber of the mobile device 304, the application 306 can send a registration/de-registration request directly through the interface 311 to the application server 301 and get registration/de-registration response from the application server 301.

In the end, after registration/de-registration request and response, both the application 306 and the application server 301 have record about whether the mobile device 304 and the application 306 are registered for instant messaging services from the application server 301.

If the mobile device 304 and the application 306 are indeed registered for instant messaging service from the application server 301 and if the application server 301 has immediate updates for the application 306 in the mobile device 304, then the application server 301 can send instant notification messages to the mobile device 304 and the application 306 through the interface 312 with the instant messaging server 303, the interface 313 with the instant messaging client 305, and the interface 308 with the application 306. After instant notification messages are received, optionally they can be displayed on the screen of the mobile device 304. The application 306 can further process instant notification messages with option to communicate back to application server 301 through the interface 311, fetch updates, and/or execute updates.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method providing messaging and updating services over the air from application servers to their corresponding applications in mobile devices via instant messaging servers and communication networks, the method comprising the acts of:

setting up accounts by subscribers of said mobile devices and by application service providers of said application servers with said instant messaging servers via said communication networks;

with permissions of said subscribers, creating registrations for said mobile devices and said applications with said application servers via said communication networks for instant messaging services from said application servers;

if there are pending updates for registered said mobile devices and registered said applications from said application servers, then sending instant notification messages from said application servers to registered said mobile devices via said instant messaging servers and said communication networks;

receiving and processing said instant notification messages in registered said mobile devices by registered said applications;

registered said applications communicating back to said application servers and fetching updates from said application servers to registered said mobile devices via said communication networks;

executing said updates by registered said applications;

wherein said subscribers are the owners and/or users of said mobile devices; and wherein said application servers and said mobile devices have instant messaging clients that can subscribe to and communicate with each other for instant message exchange via said instant messaging servers and said communication networks.

2. A method providing messaging and updating services over the air from application servers to their corresponding applications in mobile devices via instant messaging servers and communication networks, the method comprising the acts of:

setting up accounts by subscribers of said mobile devices and by application service providers of said application servers with said instant messaging servers via said communication networks;

with permissions of said subscribers, creating registrations for said mobile devices and said applications with said application servers via said communication networks for instant messaging services from said application servers;

if there are pending updates for registered said mobile devices and registered said applications from said application servers, then sending instant notification messages from said application servers to registered said mobile devices via said instant messaging servers and said communication networks;

receiving and processing said instant notification messages in registered said mobile devices by registered said applications;

registered said applications communicating back to said application servers and fetching updates from said application servers to registered said mobile devices via said communication networks;

executing said updates by registered said applications;

wherein delivery of said instant notification messages from said application servers to registered said mobile devices via said instant messaging servers and said communication networks is performed by a sequence of network interfaces including intermediate entities of instant messaging clients in said application servers, said instant messaging servers, and instant messaging clients in registered said mobile devices; and wherein received said instant notification messages in registered said mobile devices are relayed to registered said applications through application programming interfaces via said instant messaging clients in registered said mobile devices.

3. A system providing messaging and updating services over the air from application servers to their corresponding applications in mobile devices via instant messaging servers and communication networks, the system comprising:
   instant messaging servers;
   application servers;
   mobile devices with applications corresponding to application servers;
   communication networks; and performing the acts of:
   setting up accounts by subscribers of said mobile devices and by application service providers of said application servers with said instant messaging servers via said communication networks;
   with permissions of said subscribers, creating registrations for said mobile devices and said applications with said application servers via said communication networks for instant messaging services from said application servers;
   if there are pending updates for registered said mobile devices and registered said applications from said application servers, then sending instant notification messages from said application servers to registered said mobile devices via said instant messaging servers and said communication networks;
   receiving and processing said instant notification messages in registered said mobile devices by registered said applications;
   registered said applications communicating back to said application servers and fetching updates from said application servers to registered said mobile devices via said communication networks; and
   executing said updates by registered said applications;
   wherein said subscribers are the owners and/or users of said mobile devices; and wherein said application servers and said mobile devices have instant messaging clients that can subscribe to and communicate with each other for instant message exchange via said instant messaging servers and said communication networks.

4. A system providing messaging and updating services over the air from application servers to their corresponding applications in mobile devices via instant messaging servers and communication networks, the system comprising:
   instant messaging servers;
   application servers;
   mobile devices with applications corresponding to application servers;
   communication networks; and performing the acts of:
   setting up accounts by subscribers of said mobile devices and by application service providers of said application servers with said instant messaging servers via said communication networks;
   with permissions of said subscribers, creating registrations for said mobile devices and said applications with said application servers via said communication networks for instant messaging services from said application servers;
   if there are pending updates for registered said mobile devices and registered said applications from said application servers, then sending instant notification messages from said application servers to registered said mobile devices via said instant messaging servers and said communication networks;
   receiving and processing said instant notification messages in registered said mobile devices by registered said applications;
   registered said applications communicating back to said application servers and fetching updates from said application servers to registered said mobile devices via said communication networks; and
   executing said updates by registered said applications;
   wherein delivery of said instant notification messages from said application servers to registered said mobile devices via said instant messaging servers and said communication networks is performed by a sequence of network interfaces including intermediate entities of instant messaging clients in said application servers, said instant messaging servers, and instant messaging clients in registered said mobile devices; and
   wherein received said instant notification messages in registered said mobile devices are relayed to registered said applications through application programming interfaces via said instant messaging clients in registered said mobile devices.

* * * * *